United States Patent [19]
Breau

[11] 3,871,331
[45] Mar. 18, 1975

[54] ANIMAL LITTER DISPOSAL UNIT
[76] Inventor: George Breau, RFD 1, Rumford, Maine 04276
[22] Filed: Feb. 1, 1974
[21] Appl. No.: 438,947

[52] U.S. Cl. .................................................. 119/1
[51] Int. Cl. .......................................... A01k 29/00
[58] Field of Search ............................ 119/1, 15, 29

[56] References Cited
UNITED STATES PATENTS
| | | | |
|---|---|---|---|
| 3,119,374 | 1/1964 | Ladner | 119/29 |
| 3,318,285 | 5/1967 | Betham | 119/1 |
| 3,339,527 | 9/1967 | Burroughs | 119/1 |
| 3,771,491 | 11/1973 | Hunter | 119/1 |
| 3,793,988 | 2/1974 | Traeger | 119/1 |

*Primary Examiner*—Robert Peshock
*Assistant Examiner*—J. N. Eskovitz

[57] ABSTRACT

This invention provides an animal litter disposal unit which comprises in combination an enclosed housing with means for ingress and egress for an animal. The floor of the housing comprises an endless belt for use by the animal when it litters. After the animal exits from the litter disposal unit at least a portion of the endless belt and at least a portion of said housing is cleansed and dried. The accumulated litter and cleansing material are removed from the litter disposal unit.

3 Claims, 5 Drawing Figures

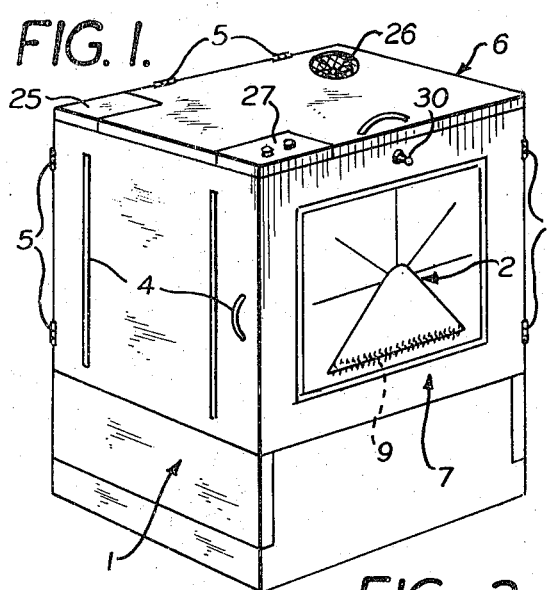
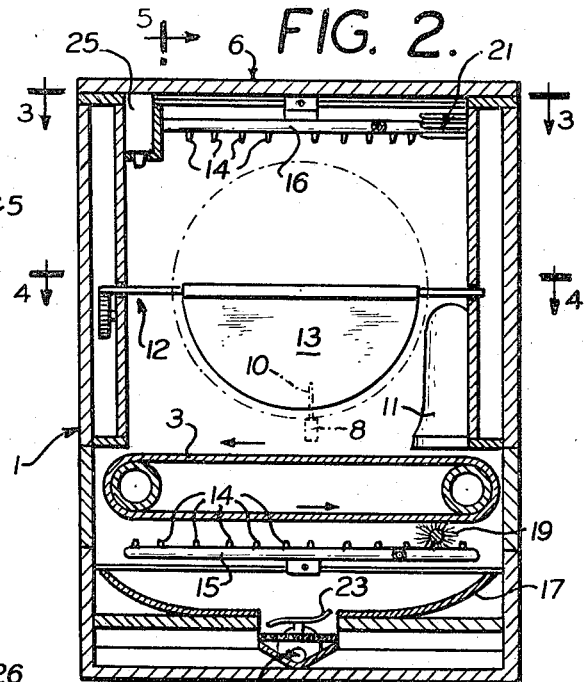
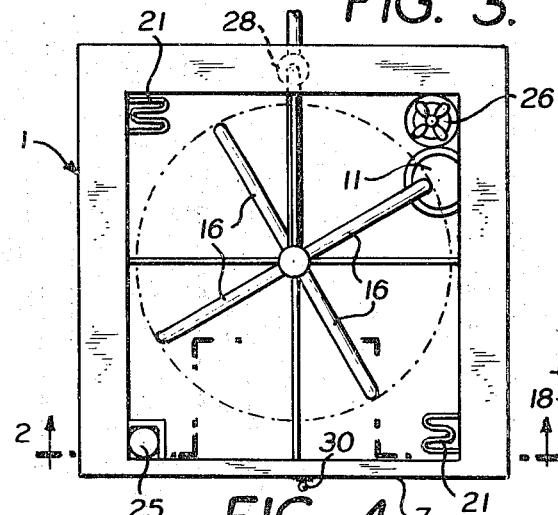
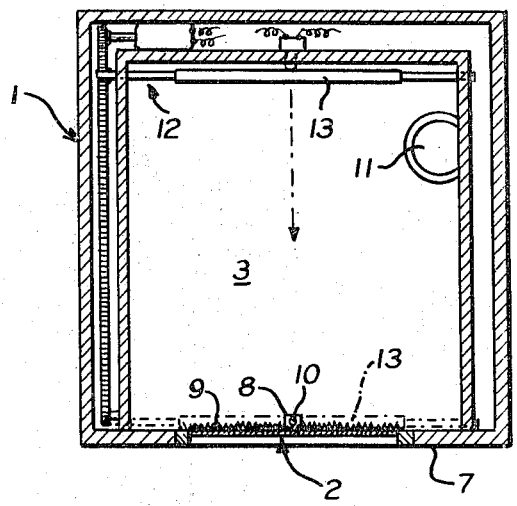
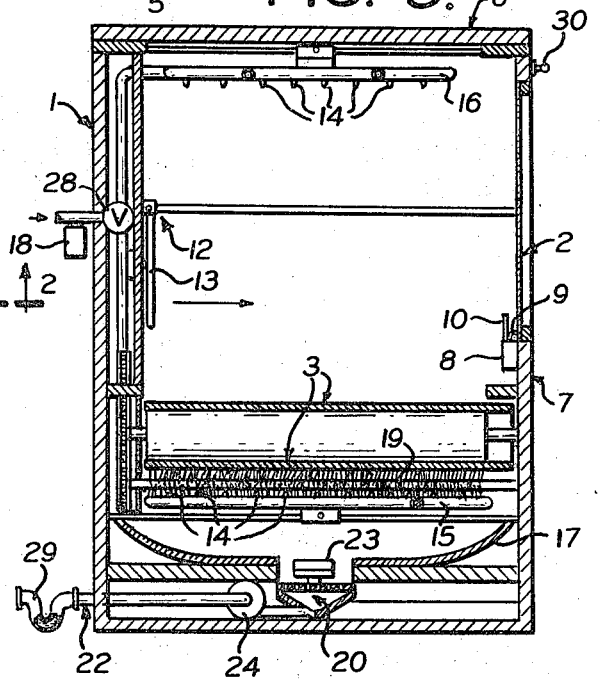

ANIMAL LITTER DISPOSAL UNIT

BACKGROUND OF THE INVENTION

1. Field of the Invention

This invention relates generally to the proper disposal of animal urine and fecal matter which has long been a problem. This is especially critical in urban life.

It has also been a long standing problem to provide toilet facilities for pets or animals which can be installed in a house, or adjacent thereto. Disposal units which will permit the pet or animal to use the toilet and which are fully self-cleansing and operative without the need for daily human intervention and servicing are especially desirable. Such an animal toilet must be hygienic, must not give rise to a malodorous condition and must be relatively service free. Further, such a successful animal toilet must be attractive to the pet and must induce the pet to use the toilet in a tranquil fashion.

It is an object of this invention to solve these problems and, in addition, to provide a facility for the animal which will be attractive and which will induce the animal to use it so that the general well-being of the animal will not be impaired.

2. Description of the Prior Art

The art is replete with attempts to provide a suitable toilet facility for animals but has always failed in one aspect or another in achieving a result which satisfies all the criteria for a useful and completely hygienic product, and one which will be attractive to the animal.

In many of the prior art devices the cleansing operation is performed by a spray of water to facilitate the run-off of animal urine or excreta after animal litter has occurred. The platform or floor which the animal has utilized is, at the time of cleansing, inclined so that run-off can take place. Such cleansing is incomplete in that it depends solely on the water spray much like a toilet bowl for human use. Further, in some prior art devices, since the platform on which the animal is perched during litter is inclined, the facility is injurious to the tranquility of the animal who prefers a horizontal surface. Such unsuccessful attempts to solve the animal litter problem are exemplified by U.S. Pat. Nos. 2,883,963; 3,119,373; 3,318,285 and 3,734,057.

Other attempts of the prior art have included horizontal platforms for the animal during periods of toilet use, which platform is then tilted to an inclined position during the cleansing operation and are exemplified by U.S. Pat. Nos. 3,227,138 and 3,747,563.

It is obvious that a platform which is tilted when the animal litters requires extra training of the animal for its use. Further, devices which have a platform which is tilted during the cleansing operation are cumbersome to construct and are not completely cleansed when only a spray of water is utilized.

SUMMARY OF THE INVENTION

It is the object of this invention to overcome the above-described drawbacks of the prior art.

Another object and feature of the present invention is to provide a toilet facility for animals which is absolutely hygienic to the animal and provides environmental protection to the surroundings in which the unit is placed.

A further object and feature of the present invention is to provide an area for animal litter which is aesthetically pleasing.

A still further object and feature of the present invention is to have minimum training of the animal in order for it to utilize the automatic disposal unit, and that such use be pleasing and for the well being of the animal.

The present animal litter disposal unit includes a housing with means for an animal to ingress and egress therefrom after it litters. Included in the housing are means for cleansing the interior areas of the housing and an endless belt at the lower portion of said housing. Said endless belt serves as the platform on which the animal rests during periods of toilet use. Also included in the housing are means to dry the inside of the housing after the cleansing operation. Preferably the unit also provides for safety means so that said cleansing operation can not begin until the animal has in fact left the interior of the housing portion of the litter disposal unit. In a preferred embodiment the various operations are performed automatically, with provisions being made to be able to perform the operations manually, if that is felt to be desirable.

The cleansing operation can have incorporated therein a suitable detergent that is automatically metered into the water supply.

The waste material and waste liquids are disposed of through a drain at the bottom of the unit. In the preferred embodiment the drain means includes a disposal unit that chops, liquefies and forces said waste material into the sewer waste system.

The chopping and liquification operation prevents clogging of the drain. The means for forcing said waste material into the sewer waste system serves to prevent any accumulation of waste at the entry portion of the drain in the housing unit and prevents any malodor from emanating from this portion of the unit.

A scent attractive to the particular animal using the animal disposal unit can be introduced into the enclosed environment of the housing. Means for ventilating the unit are provided. Ventilation performs two functions. Firstly, airing and keeping the unit dry after use, and secondly, enabling miniscule amounts of the aromatic atomized scent to escape into the surrounding environment so as to be noticeable and attract the animal to the disposal unit.

BRIEF DESCRIPTION OF THE DRAWINGS

FIG. 1 is a front perspective view;

FIG. 2 is a vertical section of the device shown in FIG. 1 taken along line 2—2 of FIG. 3;

FIG. 3 is a sectional view taken along line 3—3 of FIG. 2;

FIG. 4 is a sectional view taken along line 4—4 of FIG. 2; and

FIG. 5 is a sectional view taken along line 5—5 of FIG. 2.

DESCRIPTION OF THE PREFERRED EMBODIMENTS

Referring to the drawings and in accordance with the present invention, the animal litter disposal unit includes a housing 1, means 2 for the entrance into said housing by an animal for purposes of toilet use, and a means for exit therefrom by the animal after excretion or urination. Positioned at a lower portion of said housing 1 and in a substantially horizontal manner is an endless belt 3 which serves as the platform on which the animal rests during periods of its toilet use. Included in the housing 1 are means for cleansing the walls of the housing 1, for cleansing the endless belt 3, and for the automatic activation of these cleansing means by the exiting of the animal from the housing when the unit is being operated automatically. Also included are means for the removal of the animal waste and the cleansing material from the housing.

The housing 1 contemplated in this invention is of a suitable size to accommodate the animal making use thereof. The most common use of the device of the invention would be for a household pet, such as a dog or cat. The housing must be of suitable external appearance so that it can be maintained in a house or adjacent thereto, and present an aesthetically pleasing appearance. However, since the disposal unit will normally be installed inside a house adjacent to normal waste drain facilities, such a unit will normally be installed in a kitchen or bathroom of a house. In such a circumstance, a suitable exterior appearance for the housing would simulate a washing or drying machine of the type normally distributed commercially. It would also be suitable to permit adaptation of the disposal unit to match existing appliances by providing means on said housing to include panels of varying colors and designs to be installed on its external areas so as to permit the owner to match or to blend the disposal unit with the decor of the surroundings in which the unit is to be installed.

Such means may be by the use of ridges 4 adapted at the outside edges of the housing so that panels of various colors and sizes may be fastened.

The housing 1 structure is constructed in such a manner so as to provide easy access thereto for purposes of manual cleaning, maintenance or replacement of parts. Accordingly, in the preferred embodiment, the upper portion 6 and the front portion 7 may be swung away from the housing 1 by hinged means 5.

The interior surfaces of the unit is such as to particularly support the cleansing means and the various other machinery required for the operation of the unit without at the same time being unduly heavy or difficult to install. The interior surface of the unit also permits the carrying out of the cleansing operation which in a large measure comprises a spray of water and, as contemplated by one aspect of this invention, comprises a spray of water at least for some period of time under pressure. Also, since another aspect of this invention contemplates the use of cleansing agents, waterproof as chemical detergents, the interior of the housing is not only waterproof but is also impervious to the action of such cleansing agents. In another aspect of this invention it is contemplated that a drying operation is carried out after the cleansing operation so as to render the unit immediately available for reuse and, accordingly, the internal surface of the housing is also resistant to water and cleansing agents at elevated temperatures used for such drying purposes. Such internal waterproff and resistant surfaces are known in the art and are provided in todays market in such devices as clothes washing and drying machines and in dishwashing machines.

The means for ingress and egress 2 of the animal for use of the unit normally controls the automatic features of this invention. Thus, cooperating with said entrance and exit means there is an electrical or mechanical automatic pulse counter means 8 for detecting the use of the entrance by the animal and so arranged so as to count two uses, i.e., ingress and then egress, before activation of the safety operation, and the cleansing, flushing and drying operations all hereinafter more fully described.

The means for egress and ingress 2 is preferably slightly elevated to a suitable height so as to prevent leakage during the cleansing cycle and to contain the animal litter within the unit. The means for egress and ingress 2 has a sufficient resistance so that stray or weak impulses thereto will not move such means and actuate any electrical or mechanical automatic counting means 8 used to positively bring into play the safety or the cleansing cycles. At the same time such ingress and egress means 2 is yielding to the pressure or force exerted by the pet in using the unit. In a more preferred embodiment further means 9 is associated with said ingress and egress means 2 to adjust the tension or resistance of such ingress and egress means 2 in relationship to the size and power of the animal utilizing the unit. As indicated above, the ingress and egress means 2 is, when in a closed position, leakproof and locked so as to prevent spillage and the entry of any animals into the housing during the cleansing operation. In addition, the ingress and egress means 2 is relatively impervious to the action of the water, any cleansing agent or any heating utilized.

The automatic safety and cleansing operation is preferably associated with the use of the ingress and egress means 2. Such means are positioned to cooperate with the ingress and egress means to detect the entrance of the animal and its exit from the unit. Thus, as an example, after the pulse counter 8 serves to count off two pulses, one for the pet entering the unit and the next for the pet leaving the enclosure, the pulse counter then provides an output signal to engage the safety means 12. The safety means searches the internal area of the housing unit to insure that no animal is within the unit and then the ingress and egress means 2 is locked by a lock 10 so that no animal may enter into the unit. At the completion of either an electrical or mechanical safety sweep or search of the interior of the housing, and the locking of the ingress and egress means, an output signal thereafter activates the cleansing and drying cycles as described in more detail below.

An important feature of this invention is the platform on which the animal stands during a period of litter and which comprises an endless belt 3 which the animal mounts on entering the unit, and rests upon when littering. This endless belt 3 is in a substantially horizontal position and is in the lower portion of the unit. The endless belt 3 occupies substantially the entire width and length of the interior of the unit acting as a toilet floor for the animal. The uppermost portion of the endless belt on which the animal mounts is preferably at least slightly underneath the lowermost portion of the ingress and egress means 2 so that the animal steps down onto the endless belt. This position of the belt serves to help prevent leakage during the cleansing cycle. The construction of the material from which the endless belt 3 itself is made is not critical and any material which can withstand any deleterious effect of water, cleansing agents or heat can be used. In addition, the endless belt 3 is preferably also able to withstand, at least to some extent, the effect of abrasion caused by a mechanical cleansing action as set forth in greater detail below. Preferably, the endless belt 3 is constructed of a fibrous material such as to resemble a grassy surface to more closely present to the animal what appears to be an area relatively similar to an outdoor habitat. Such products including carpets which simulate grass are well-known and preferably serve as the outer surface of the endless belt 3. Such outer surfaces not only serve to present to the animal the maximum of naturalness for toilet use but are also resistant to water, cleansing agents, heat and are also sufficiently abrasion resistant to withstand a scrubbing action.

In the operation of the unit the animal preferably enters the unit through the portal 2, completes its toilet sequence and leaves the unit through the same portal 2. It can be seen that several portals can be provided but it is found preferable to use a single means for ingress and egress which activates the safety, cleansing and drying cycles upon the egress of the animal.

The use of the toilet unit by the animal will involve the deposit of urine and/or fecal matter on the platform, which is in fact what is at that time the portion of the endless belt in the upper position. In certain instances, especially with male dogs, where the animal is accustomed to urinate against a vertical surface, the inner walls of the unit will also possibly be soiled. For such animals, the unit can preferably be equipped with an upstanding member or members 11 which simulates an upright tire, post, stanchion or fire plug. Such an upstanding member is either integral with the unit or removably attached thereto.

It thus becomes necessary, after insuring that the animal has exited from the unit, that the unit, particularly the endless belt 3, the upper portion of which also serves as a platform, and any wall portions, be suitably cleansed.

A most preferable feature of this unit is a safety device 12 comprising an adjustable arm 13 which is activated upon the egress of the animal after the use of the toilet and which sweeps the endless belt area to make certain that the animal has left the unit prior to the locking of the ingress and egress means 2 and the start of the cleaning cycle. The arm is adjustable so that it makes the electronic or mechanical sweep or pass at any desired height above the upper surface of the endless belt 3 to take into account the size and bulk of the animal utilizing the unit. A further important aspect of the invention is the provision of means 10 to secure or lock the ingress and egress means 2 to prevent the accidental entry of any animal during the cleansing operation and thereby avoid injury to the animal.

After the animal has ceased its toilet functions it will normally leave the unit. This departure activates the pulse counter 8 so that the automatic mechanism for the safety search and subsequent cleansing and drying cycles ensues. This preferably first involves, in any desired order or simultaneously, the prior operation of the safety devices 12. The adjustable arm 13 which is preferably present in the unit, either electrically or mechanically sweeps the lower portion of the unit to make certain that the animal has exited therefrom. Thus, the ingress and egress portal 2 locks by lock 10 to prevent accidental entry of the animal during the cleaning cycle. Following these preferred safety operations the cleaning operation ensues.

The cleansing operation is, of course, vital to the proper functioning of the unit. This operation involves the cleansing of the inner surfaces of the unit and the upper and lower portions of the endless belt by a spray of cleansing liquid, preferably water, under at least some pressure and hurled with some substantial force. This is accomplished by the forcing of the water through suitable spray nozzles 14, at least some of which are borne in a whirling arm mounted in the lower 15 and upper 16 portions of the unit which serve to hurl the water with substantial centrifugal force, so that a certain dosage of water will be advantageously directed against the various inner wall surfaces of the unit and the upper and lower portions of the endless belt 3. Suitably a bank of the nozzles mounted on the lower whirling arm 15 and the upper whirling arm 16 is positioned so that the direction of the water is directed so as to thorougly cleanse any particular internal area of the unit. Provision is also made for a separate or adjustable spray member which is positioned for thorough cleansing of the side wall surfaces including upright posts or stanchion members that are especially used by male dogs.

Prior to the full cleansing cycle ensuing it is preferable to effect a pre-cleansing operation. Such a pre-cleansing operation is suitably carried out by the automatic revolution of the endless belt 3 sufficient to bring the entire heretofore upper surface of the endless belt which bears the portion just recently soiled by the animal into a lower surface position. In the pre-cleansing operation the cleansing liquid, preferably water, is directed from the top position to pre-clean the upper portion of the unit and water from a suitable source in the lower portion of the unit is directed in an upward direction on the lower portion of the endless belt. Thus, the walls of the unit in the upper portion are pre-cleansed and the just-soiled endless belt is washed free of a major portion of any urine or solid fecal matter which has been deposited thereon. The rinse water and waste, including solid waste, from the pre-cleansing operation on the endless belt fall into the collecting dish 17 at the very bottom portion of the unit to be drained out as set forth in greater detail below.

After the preferred pre-rinse cycle, a more thorough cleansing operation preferably follows. Here it is preferred that cleansing agents be added. This is suitably accomplished by the measured addition of such suitable cleansing agent such as a commercial detergent from a suitable reservoir 18 to the water washing the upper portion of the unit and the water washing the under portion and downwardly facing portion of the endless belt 3. It is most convenient to have a single source of water with means for directing this water to both the upper and lower portions of the unit. As hereinbefore explained, the water is preferably issued as a spray or jet by issuance of the water through restricted orifices or nozzles 14, and by a throwing of the water by suitable lower 15 and upper 16 whirling arm propellers so as to achieve a centrifugal force.

In addition it is extremely preferable to ensure the thorough cleansing of the soiled portion of the endless belt and this is suitably accomplished by the provision of a scrubbing brush 19 which engages the belt and scrubs the endless belt while a pressure of water containing a cleansing agent is directed preferably substantially at the surfaces as they are being scrubbed. It is preferable that the scrubbing brush 19 or brushes engage this portion of the endless belt 3 to be cleaned after the pre-cleansing cycle is completed so that the brushes are kept free, as much as possible, of solid waste matter.

In a suitable embodiment, the cycle after the pre-rinse would be as follows. The underside portion of the endless belt 3 is revolved automatically back to its upper original position. Then the full cleansing cycle begins. With the full cleansing cycle a jet or spray of water and detergent is directed downwardly onto the upper portion of the unit as previously described. Substantially simultaneously the belt begins to revolve again and just prior to this a brush 19 or a set of brushes come into engagement with the underside surface of the endless belt. This brush 19 or set of brushes is suitably across the entire width of the belt at substantially right angles to the direction of revolution of the belt. As the belt revolves and the soiled belt surface again moves to a downward position a jet or spray of water containing a cleansing agent is directed against the soiled portion of the endless belt as it moves downwardly and as it is being scrubbed.

The brush 19 or brushes are preferably made of long bristles which penetrate deep into and preferably engage the backing on the endless belt 3, especially when the endless belt 3 is constructed of a fibrous material to simulate grass. In this manner the entire original upper surface containing the soiled portion of the endless belt is scrubbed and cleansed during the full cleansing operation.

After the full cleansing operation has ceased the brush 19 or brushes are automatically removed from engagement with the belt and the upper and lower portions of the unit are subjected to a jet or spray of water, preferably under pressure, to wash the entire interior of the unit, including the endless belt 3 and the brush 19 or brushes clean. It is preferable that prior to the final wash a slight time be permitted to elapse so as to let as much of the water and cleansing agent as possible drain down and out of the drain 20 at the bottom of the unit.

Subsequent to the final wash and a further preferred draining period the unit is preferably dried by suitable heating elements 21 disposed within the unit. By this drying cycle the unit is rendered immediately ready for reuse by the animal.

The drain 20 is preferably found in the lowermost portion of the unit and is connected to the common waste drain for the building by suitable plumbing 22. In a suitable preferred embodiment of this invention the drain 20 includes chopper means 23 to cut and segment the solid waste so as to ensure that no clogging of the drain 20 and waste plumbing 22 occurs.

In another suitable preferred embodiment of this invention the chopper means 23 is associated with a pump 24 so as to force the waste material into the common waste drain of the building thus leaving only rinse water mixed with detergent at the bottom of the drain 20 or in the plumbing 22 adjacent to the disposal unit.

In a further preferred embodiment of this invention the connection from the drain 20 of the disposal unit to the common waste drain or sewer system is through a means 29 capable of providing a pure water seal between the disposal unit and the sewer. Such a seal means is preferably a U-shaped trap of the normal type known in the plumbing art. Pump 24 cooperates with this U-shaped trap 29 by being adjusted to direct a final charge of clean water, after the cleansing cycle has been completed, at the trap to dispose of the final rinse water residing in the trap and replace it with clean fresh water as a barrier between the sewer and the unit. This prevents odors that escape from the sewer to enter back into the unit.

It is an especially preferred embodiment of this invention to restore to the unit, after the cleansing cycle, the necessary odors which made the unit a pleasant and familiar surrounding for the animal. It can be seen that the use of detergents and chemicals in the cleansing cycle so necessary for the hygienic operation of this invention serve also to remove from the unit the familiar odors which would otherwise render the unit a favorite animal habitat. This defect is easily remedied by providing a means 25 for the atomization of a sufficient quantity of animal-pleasing scent particularly attractive to the type animal utilizing the disposal unit, to the interior environmental portion of the unit after the cleansing cycle is completed. Ventilation means 26 is also preferably provided so as to permit air circulation within the unit. Besides providing air circulation to the unit, the ventilation system serves the additional function of allowing miniscule amounts of the atomized animal pleasing scent to escape into the atmosphere surrounding the disposal unit, making the disposal unit more noticeable and attractive to the particular animal utilizing the unit.

It is also contemplated within one aspect of this invention that the unit be equipped with sound transmitting means 27 such as an automatic tape recorder whereby the voice of the master can be transmitted so as to exert a calming and tranquilizing effect on the animal and induce it to use the disposal unit.

It is also contemplated within the scope of this invention that, in addition to the means 5 permitting manual cleaning, means are provided, such as hinged doors, for the loading of quantities of cleanser and/or scent to be dispensed during the automatic operation of the unit, and for the mounting of the endless belt.

In a preferred embodiment the disposal unit is operated automatically, with provision being made for manual operation through switch 30. Accordingly, where the switch is on automatic, the various cycles, such as safety sweeping, locking of the ingress and egress portal, pre-cleansing, rotation of the endless belt, cleansing and scrubbing of the endless belt, addition of cleansing agents, drying, addition of scent, and etc. are all carried out in the desired sequence. When the switch is placed on manual, the owner of the pet can select one or more sequences of the cycle as he desires. Thus, the owner may simply select a pre-cleansing operation solely. In this manner the owner of the pet can avoid using an entire cycle of operation when he is at home and notes that such a full cycle is not needed. Conversely, when the owner is not on the premises, the disposal unit can be put on automatic, and the owner can leave the premises uncared for during periods of time in the safe knowledge that his animal will be able to attend to his toilet requirements as needed and in a hygienic and satisfactory environment without injury to the surroundings.

I claim:

1. An animal litter disposal unit comprising in combination:
   a. a housing;
   b. means for ingress and egress for an animal;
   c. support means comprising an endless belt positioned in a substantially horizontal manner at the lower portion of said housing for use by said animal during a period when said animal litters;
   d. means for cleansing at least a portion of said support means and at least a portion of said housing;

e. means for activating said cleansing means when said animal exits from said unit;

f. means for removal of said litter and cleansing material from said unit; and g. said removal means including means for segmenting said litter into substantially small particles of waste.

2. An animal litter disposal unit according to claim 1 including means adapted to provide a barrier of fresh water between said unit and said removed litter after said cleansing.

3. An animal litter disposal unit comprising in combination:

a. a housing;

b. means for ingress and egress for an animal;

c. support means comprising an endless belt positioned in a substantially horizontal manner at the lower portion of said housing for use by said animal during a period when said animal litters;

d. means for cleansing at least a portion of said support means and at least a portion of said housing;

e. means for activating said cleansing means when said animal exits from said unit;

f. means for removal of said litter and cleansing material from said unit; and g. means adapted to provide a barrier of fresh water between said unit and said removed litter after said cleansing.

\* \* \* \* \*